United States Patent [19]

Delebecque

[11] Patent Number: 4,556,282
[45] Date of Patent: Dec. 3, 1985

[54] DEVICE FOR CONNECTING OPTICAL FIBERS

[76] Inventor: Robert P. Delebecque, 156 bis, rue d'Aulnay, 92290 Chatenay Malabry, France

[21] Appl. No.: 532,108

[22] Filed: Sep. 14, 1983

[30] Foreign Application Priority Data

Sep. 17, 1982 [FR] France .................................. 82 15691

[51] Int. Cl.⁴ .............................................. G02B 7/26
[52] U.S. Cl. ................................ 350/96.21; 350/96.22
[58] Field of Search ................. 350/96.20, 96.21, 96.22

[56] References Cited

U.S. PATENT DOCUMENTS

| | | | |
|---|---|---|---|
| 3,885,859 | 5/1975 | Dalgleish et al. | 350/96.21 |
| 4,186,998 | 2/1980 | Holzman | 350/96.21 |
| 4,281,892 | 8/1981 | Sitabkhan | 350/96.21 |
| 4,359,262 | 11/1982 | Dolan | 350/96.20 |

FOREIGN PATENT DOCUMENTS 0029383  5/1981  European Pat. Off. .......... 350/96.21

OTHER PUBLICATIONS

Balliet et al., "Fiber-Optic Splicing Tool", *IBM Technical Disclosure Bulletin*, vol. 25, No. 7A, Dec. 1982, pp. 3433-3434.

*Primary Examiner*—John Lee
*Attorney, Agent, or Firm*—Lowe, King, Price & Becker

[57] ABSTRACT

An optical fiber connecting device comprising a housing including a central two-fiber holder and four pressers slidably mounted in the housing. The holder has an alignment groove for receiving, aligning and joining endface-to-endface core end portions of two fibers, and two surfaces on either side of the groove for bearing cladding end portions of the two fibers. Two pressers are pulled by springs to press the core end portions into the alignment groove. Two other pressers are pulled by other springs to press the cladding end portions onto the bearing surfaces. The fiber connection is quickly accomplished without resorting to any disassembling of members constituting the housing.

38 Claims, 21 Drawing Figures

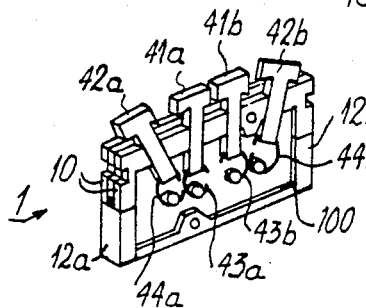
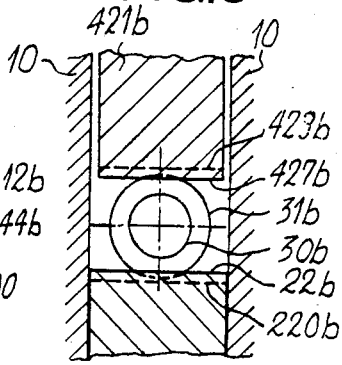
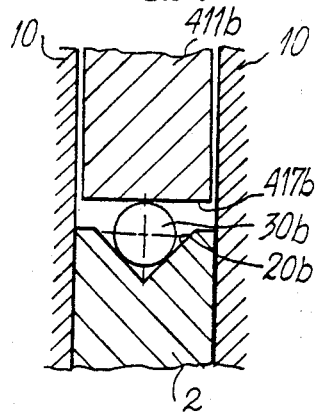
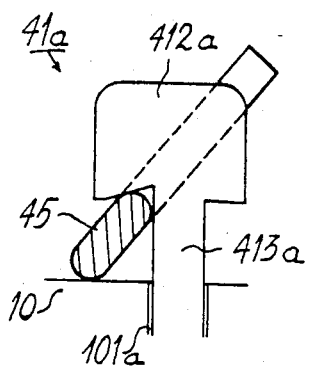
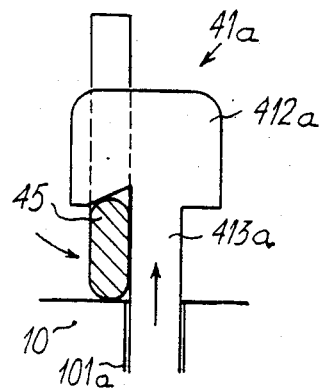
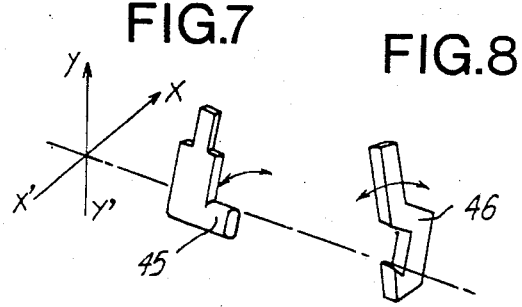

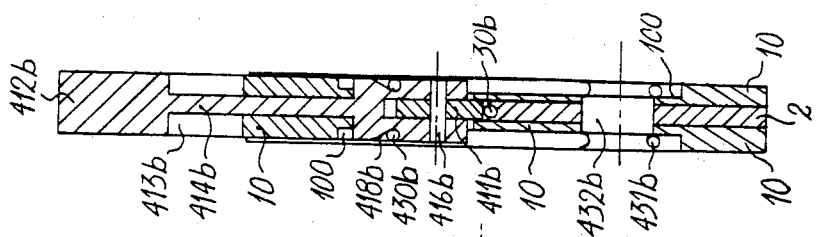
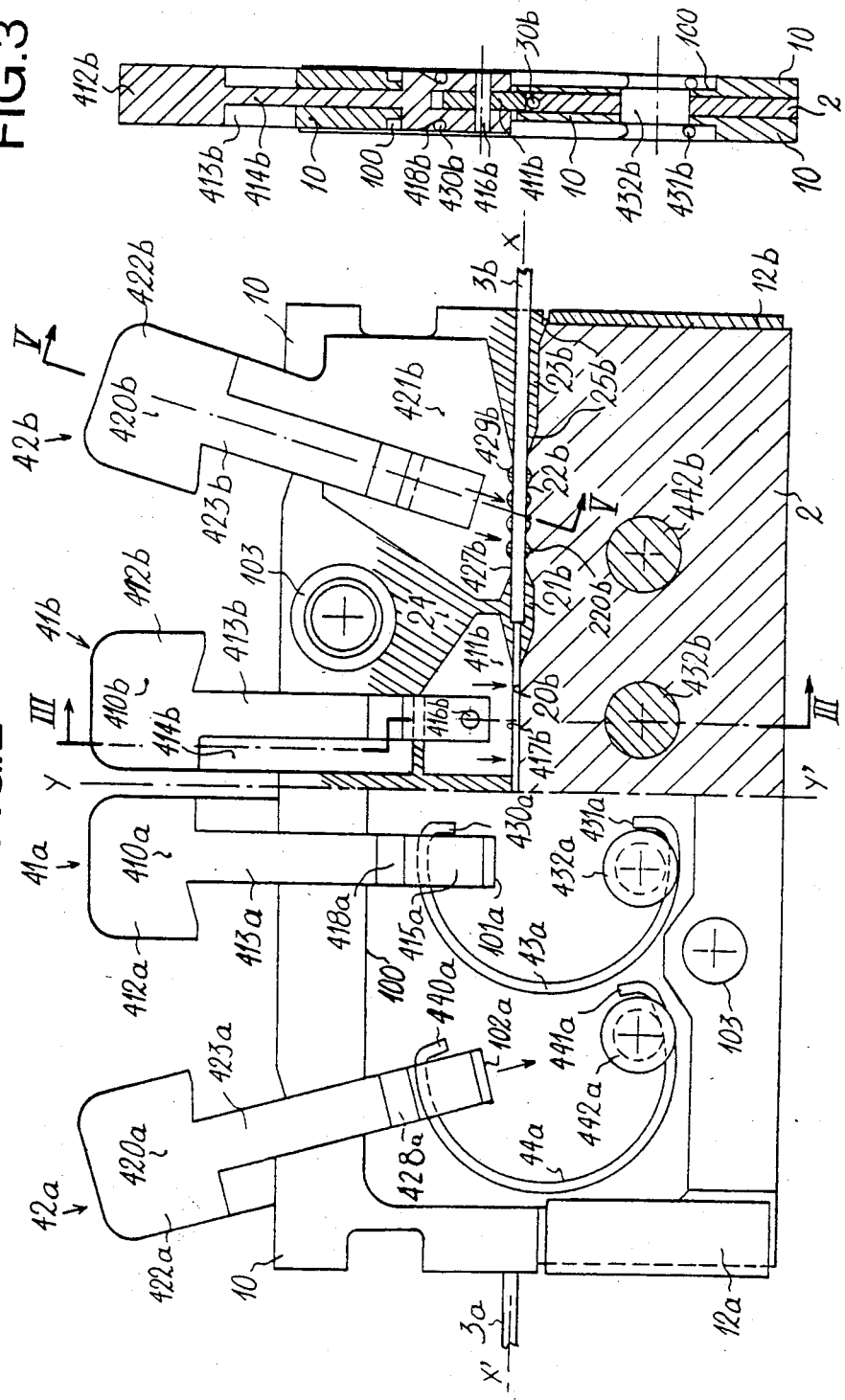

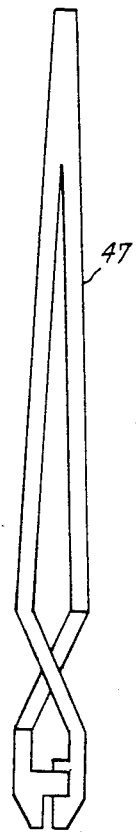
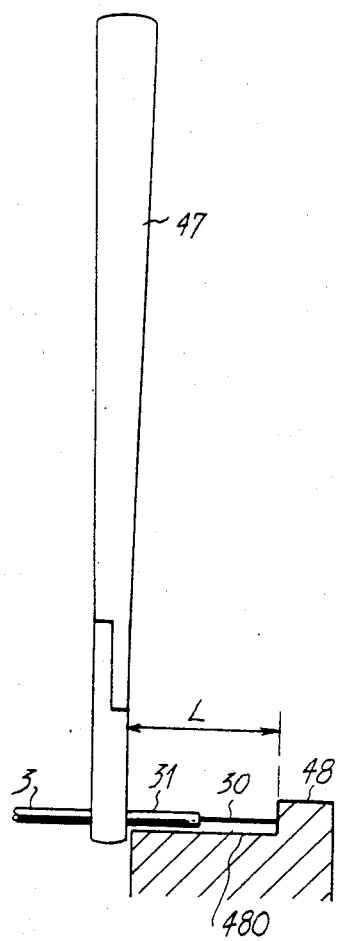
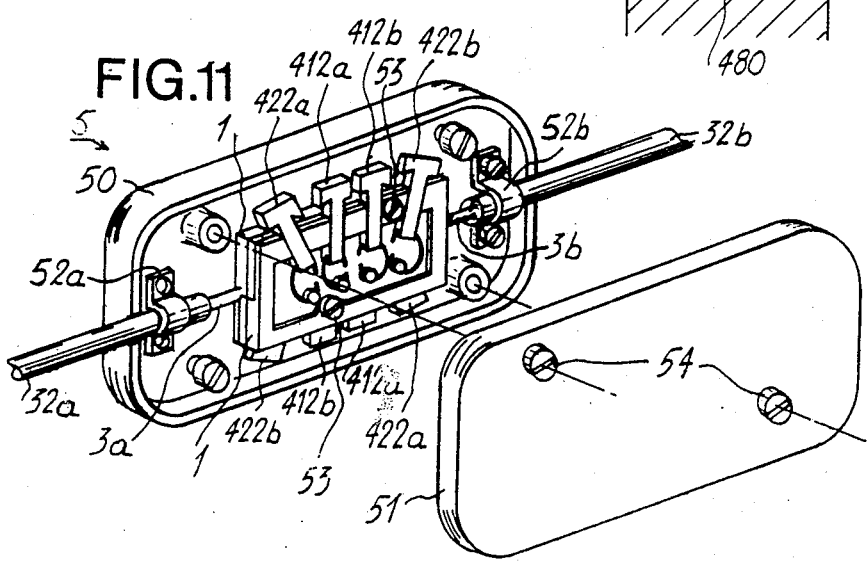

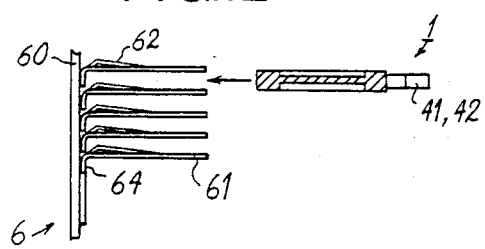
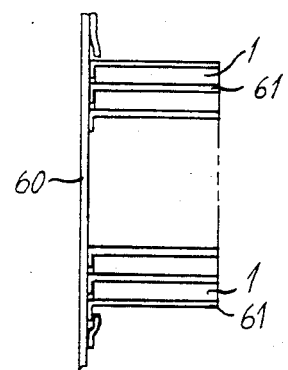
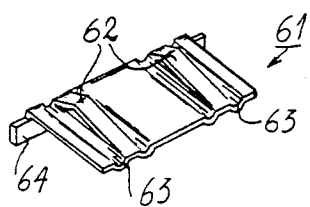
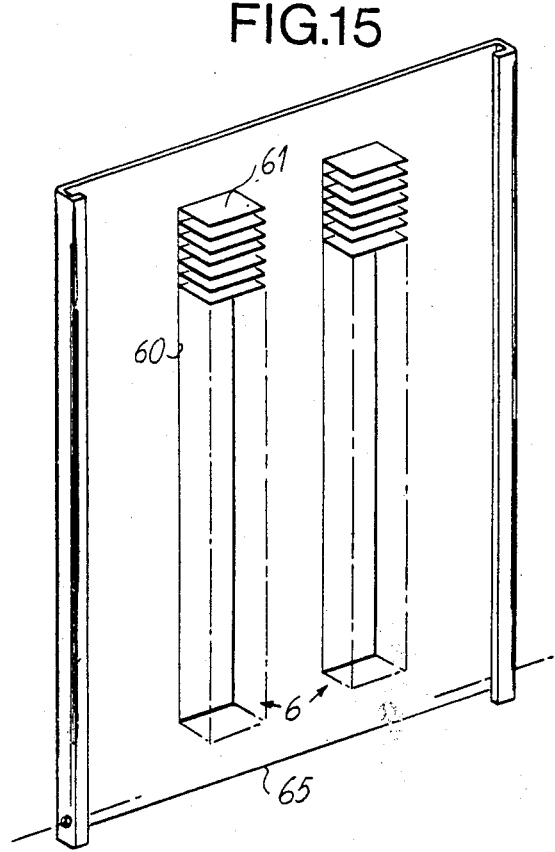

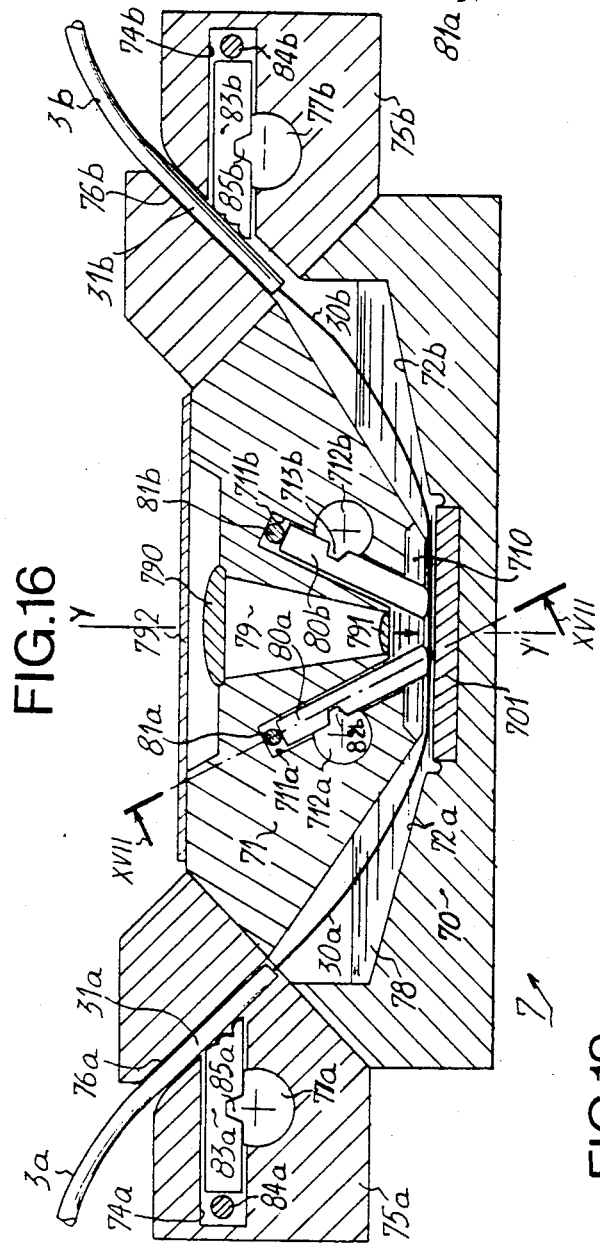
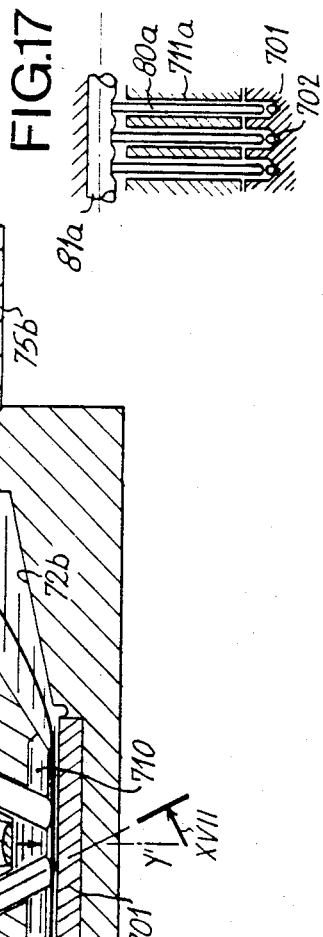
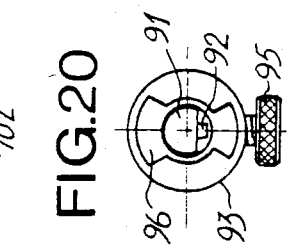
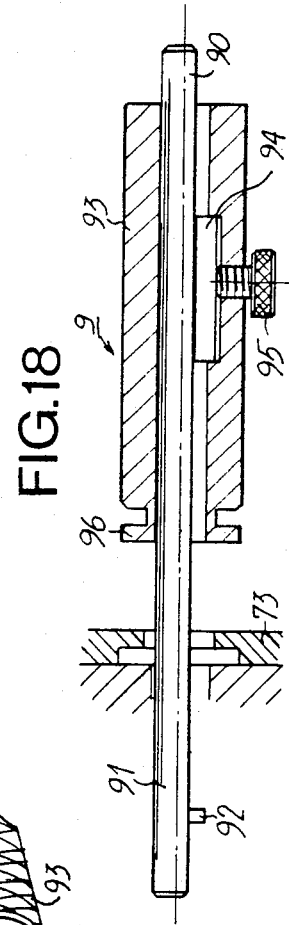
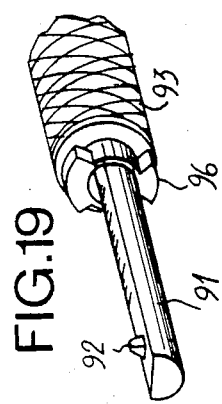

DEVICE FOR CONNECTING OPTICAL FIBERS

BACKGROUND OF THE INVENTION

1. Field of the Invention

This invention relates to a device for connecting the endfaces of two optical fibers and more particularly a connecting housing including fiber end portions supporting means having a central groove in which the core end portions of two optical fibers are aligned and joined end-to-end, and two surfaces on either side of the groove for bearing the cladding end portions of the two fibers. First means are provided for pressing the fiber core end portions into the groove, and second means are provided for pressing the fiber cladding end portions against the bearing surfaces.

2. Description of the Prior Art

Devices for connecting two optical fibers together, or two bundles of optical fibers two by two, require that the various members making up the housing be dismantled in order to insert or withdraw the optical fibers. The pressing means consist of the cover of the housing or parts embodied between the cover and the base of the housing and solidly secured to the housing. The disassembling and assembling operations for the connecting device are lengthy and tedious.

Additionally, the housings of the known connecting devices are relatively bulky and cannot be stacked when it comes to connecting numerous optical fibers two by two especially when connecting optical fiber cables.

SUMMARY OF THE INVENTION

The main object of this invention is to provide a device for quickly connecting two optical fibers without resorting to any disassembling of the members constituting the connecting device.

Briefly, the connecting device of the present invention comprises first and second pressing means that slide in the device housing over the fiber supporting means and that are brought back against the supporting means by spring means.

Although the fiber pressing means are not secured by screws or the like to the supporting means, the forces exerted by the spring means on the pressing means, and hence on the fibers, provide nevertheless an efficient hold of the fibers into the housing, thereby affording sufficient tensile resistance. The alignment of the two fiber end portions and the connection of the fiber endfaces by sliding the fibers on the bearing surfaces and in the alignment groove of the housing are as accurate as in known connecting devices and ensure transmission of optical signals under most satisfactory conditions and particularly, with low insertion loss.

The procedure of connecting the prepared ends of fibers is simply and quickly implemented since it merely entails lifting the pressing means accessible from outside the housing and slidably feeding the fibers on the supporting means in the housing.

According to a preferred embodiment of the invention, the housing is very flat, some 3 mm deep, thereby permitting stacking with other such housings with a view to building up a multifiber connecting device. The multifiber connecting device can serve in connecting several multifiber cables or in making up a column in a distribution frame connecting optical fiber cables via jumpers in optical fiber form.

The members constituting the connecting device have an expansion coefficient preferably close to that of the optical fibers thereby making sure that the fiber connection is free from any disorders caused by variations especially in temperature and humidity in the ambient environment. By way of an example, the connection qualities go virtually unchanged over temperature ranging between $-50°$ C. and $+125°$ C. and upon accidental total immersion of the connecting device in fresh or salt water.

The housing contains a gel at least in the region of the fiber endface connection for the purposes of continuity in the refractive index. According to the invention, the gel does not run under its own weight and does not ooze out through openings of the housing, thus making it possible to insert and withdraw fibers several times without adding any gel since the gel is not drawn outside by the fibers. The gel is also self-cleaning and collects any dust that may happen to be on the end portions of the fibers when being introduced into the housing.

BRIEF DESCRIPTION OF THE DRAWING

Other objects, advantages and features of this invention will become clear from the following detailed description of preferred embodiments of the invention with reference to the accompanying corresponding drawings in which:

FIG. 1 is a schematic perspective view of an elementary device for connecting two optical fibers;

FIG. 2 is an external front view on the left hand side and a cross-sectional front view on the right hand side relating the connecting device in FIG. 1;

FIG. 3 is a cross-sectional view taken along the broken line III—III in FIG. 2;

FIG. 4 is a detailed section taken along the line III-—III in FIG. 2 showing how an end portion of an optical fiber, unsheathed here, is pressed;

FIG. 5 is a section taken along the line V—V in FIG. 2 showing how an optical fiber cladding is pressed;

FIGS. 6A and 6B are schematic front views illustrating a first presser of the connecting device in FIG. 1 in the lowered and raised positions brought about by a raising tool shown in FIG. 7, respectively;

FIGS. 7 and 8 are perspective views of the tips of two presser raising tools respectively;

FIG. 9 is a front view of special pliers for clamping an optical fiber;

FIG. 10 is a side view of the pliers for clamping an optical fiber over a template;

FIG. 11 is an exploded perspective view of two elementary connecting devices housed inside a connection case for two cables each having two optical fibers;

FIG. 12 is a side view of a support for stacking elementary connecting devices with a view to forming a multifiber connecting device;

FIG. 13 is a view in perspective of a partition in the support shown in FIG. 12;

FIG. 14 is a side view of the support with the elementary connecting devices;

FIG. 15 is a front view of a distribution frame comprising several supports as shown in FIGS. 12 to 14;

FIG. 16 is a cross-sectional front view of a multifiber connecting device according to a second embodiment;

FIG. 17 is a section taken along the line XVII—XVII in FIG. 16;

FIG. 18 is an axial cross-sectional view of a raising tool for pressers in the multifiber connecting device in FIG. 16;

FIG. 19 is a perspective view of a snug end on the raising tool in FIG. 18; and

FIG. 20 is an end view of the tool in FIG. 18;

DESCRIPTION OF THE PREFERRED EMBODIMENTS

A first embodiment of an elementary device for connecting ends of two optical fibers is described hereafter with reference to FIGS. 1 to 3.

As depicted in FIGS. 1-5, the connecting device takes the form of a thin parallelepipedal composite housing 1 having a thickness approximately of 3 mm. Housing 1 comprises essentially two vertical longitudinal cover plates 10 making up the major rectangular walls of the housing. A rectangular flat holder 2 for aligning the two fibers is interposed between cover plates 10. The surface-area of holder 2 is substantially equal to half that of the plates 10. Holder 2 is held between the lower inner surface halves of parallel plates 10 below a fiber alignment axis X'X horizontal, longitudinal and substantially central to housing 1, by attaching means such as two vertical clamps clips or similar devices 12a and 12b that embrace the smaller transverse edges of both of plates 10 and holder 2.

The connecting device is symmetrical about a small vertical and transverse central axis Y'Y which defines the connection plane of the endfaces of the two optical fibers 3a and 3b to be connected. In what follows, symmetrical members, parts or portions are designated by a same reference number to which index a is added for a member included in the housing half to the left hand side of axis Y'Y and index b is added for a member included in the housing half to the right hand side of axis Y'Y as indicated in FIG. 2.

As illustrated in detail in the right hand half of FIG. 2, a V-shaped fiber alignment groove 20 is provided along the axis X'X. The groove 20 lies along the upper longitudinal horizontal edge of holder 2. On the upper holder edge, going towards the respective rearward transverse edge of holder 2, each half 20a, 20b of the V-shaped groove is followed by a first upward open recess 21a, 21b, a horizontal and planar bearing surface 22a, 22b and lastly a second upward open recess 23a, 23b giving onto the respective transverse edge of holder 2. The upper edge portions 20a to 23a, 20b to 23b are designed to receive the respective optical fiber 3a, 3b.

A detailed in FIG. 4, the V-shaped groove 20a, 20b receives an unsheathed fiber end portion 30a, 30b forming the end portion of the optical fiber 3a, 3b core. The depth of groove 20a, 20b is such that the core end portion 30a, 30b protrudes by about one third of the fiber core diameter.

As detailed in FIGS. 2 and 5, the bearing surface 22a, 22b is planar but nonetheless carries small transverse notches 220a, 220b. The bearing surface 22a, 22b is set downwards from the bottom of the groove 20a, 20b at a distance substantially less than the thickness of the cladding 31a, 31b around the optical fiber 3a, 3b. The notches 220a, 220b are intended for gripping the fiber cladding 31a, 31b when the cladding is being pushed transversally by a second presser member, as will be seen at a later stage, and thus for translationally and rotationally locking the fiber in the housing.

The bottoms of recesses 21a, 21b and 23a, 23b are set back from the groove 20a, 20b and the cladding bearing surface 22a, 22b. The recesses are filled with a gelling agent 24 that also envelops the cladding-to-core transition of the fiber in the first recess 21a, 21b and the portion of the fiber cladding 31a, 31b in the second recess 23a, 23b. Ends 25a, 25b of the second recess are chamfered so as to ensure easier fiber introduction over the central holder 2, with guidance between the inner faces of the two cover plates 10.

Each half of housing 1 further includes means for pressing the fibers against the upper longitudinal edge of fiber aligning holder 2. In each half of housing 1, the pressing means consists of a first presser 41a, 41b for pressing the core end portion 30a, 30b of the respective fiber 3a, 3b into the V-shaped groove 20a, 20b and a second presser 42a, 42b for pressing the end portion of cladding 31a, 31b of the respective fiber 3a, 3b onto the bearing surface 22a, 22b.

The first presser 41a, 41b is arranged along one side of the axis Y'Y. Presser 41a, 41b is composed of a handle member 410a, 410b having a T-shaped longitudinal cross-section, and prismatic tilting foot 411a, 411b.

Head 412a, 412b of the T-shaped handle member overhangs the upper longitudinal edges of the cover plates 10. Leg 413a, 413b of the T-shaped member forms two vertical tongues that slide in two closed-end vertical grooves 101a, 101b extending in the cover plates 10. On the axis Y'Y side, the corner of the T-shaped member 410a, 410b is filled in with a vertical central webbing 414a, 414b that slides vertically between the two plates 10 thereby holding the presser 41a, 41b in the housing. Lower end 415a, 415b of the leg of the T-shaped member 410a, 410b has shape of a fork. The tilting foot 411a, 411b is rotatably mounted about a transverse horizontal axle 416a, 416b of the fork. The foot 411a, 411b is equal in the thickness to the webbing 414a, 414b and can turn and slide between the opposed inner upper face portions of the cover plates 10.

Planar lower edge 417a, 417b of the tilting foot 411a, 411b overhangs the V-shaped alignment groove 20a, 20b as shown in FIG. 4. Edge 417a, 417b exerts a vertical pressure, parallel to axis Y'Y, along the core end portion 30a, 30b of the respective fiber 3a, 3b and applies the core end portion along two horizontal generating lines in the V-shaped groove 20a, 20b under the effect of two springs 43a, 43b against the outer faces of the cover plates 10. As depicted on the left hand half of FIG. 2 and in FIG. 3, each spring is substantially semi-circular in shape and has end tips folded over. Upper end tips 430a, 430b of the two springs 43a, 43b are anchored in two longitudinal slots 418a, 418b cut out in the tongue portions of the T-member leg 413a, 413b, above the axle 416a, 416b. Lower end tips 431a, 431b of the two springs 43a, 43b are anchored around two circular channels at the extremities of a cylinder 432a, 432b that is perpendicular to the holder 2 and integral therewith and that is arranged beneath the groove 20. The two springs 43a, 43b are symmetrical about the holder 2 and are forced against the bottoms of two great recesses 100 generally rectangular in shape and machined in the outer faces of the cover plates 10. The recesses 100 make it possible to preserve the overall parallelepipedal shape of the housing 1, since members such as the springs 43a, 43b and leg tongues 413a, 413b are coplanar therewith and parallel with the plane X'X-Y'Y.

The second presser 42a, 42b is arranged between the first presser 41a, 41b and the respective rearward vertical lateral edge of housing 1. The second presser consists of a single piece and comprises a handle portion 420a, 420b with a T-shaped longitudinal cross-section and a downward prismatic foot 421a, 421b. Head 422a, 422b of the T-shaped portion 420a, 420b overhangs the upper longitudinal edges of the cover plates 10. Two tongues formed from the leg of the T-shaped portion 420a, 420b slide in two closed-end grooves 102a, 102b extending in the cover plates 10. The leg and the corresponding grooves for the second presser are however inclined from the top to the bottom toward the vertical axis Y'Y such that horizontal and planar lower edge 427a, 427b of the foot 421a, 421b sliding in between the upper inner faces of the plates 10 tends to push the core end portion 30a, 30b of the respective fiber 3a, 3b against the other, while pressing the respective cladding 31a, 31b against the bearing surface 22a, 22b. The pressure from the second presser is also produced by two semi-circular springs 44a, 44b analogous with springs 43a, 43b; springs 44a, 44b are held against the bottoms of the recesses 100 in the outer faces of the cover plates 10 ; upper end tips 440a, 440b of springs 44a, 44b are anchored in longitudinal slots 428a, 428b cut out in portions forming tongues for the leg 423a, 423b; lower end tips 441a, 441b of springs 44a, 44b are anchored around two circular channels at the extremities of a cylinder 442a, 442b that is perpendicular to the holder 2 and integral therewith, and that is arranged beneath the bearing surface 22a, 22b.

As shown in the right hand side of FIG. 2 and in FIG. 5, the lower edge 427a, 427b of the foot 421a, 421b includes transverse notches 429a, 429b that, together with the notches 220a, 220b of the notched bearing surface 22a, 22b, translationally and rotationally lock the respective fiber 3a, 3b by slightly squashing fiber cladding 31a, 31b.

The majority of the members making up the connecting device are made entirely from metal, or plastic preferably a material whose expansion coefficient is substantially equal to that of the optical fibers, whereby excellent climatic behaviour is ensured.

FIGS. 6A and 6B show the means for raising a presser, such as 41a, against the downward force exerted by the respective spring 43a in order to insert or withdraw the respective fiber end portion into the housing. The presser raising means consist of flat end 45 of a set-square shaped tool with rounded corners, as indicated in FIGS. 6A, 6B and 7. The corner of the square is inclinably and sidewardly slipped under the free rearward corner of the head 412a of the presser 41a. By pushing down on the longitudinal upper edge of the housing 1, the square coin is then worked to a vertical position causing the presser to slide upwards and holding the presser in the raised position while the fiber end portion is being inserted or withdrawn.

FIG. 8 depicts a second type of presser raising means. In this case, end 46 of a raising tool is arranged longitudinally. End 46 rotates in the X'X-Y'Y plane of the housing thereby operating the presser when several elementary connecting devices are grouped together, as will be seen hereinafter.

A description now follows of how optical fibers 3a and 3b are connected using the above elementary connecting device according to the first embodiment.

In the peripheral surface of the cladding on the end portion of each fiber, such as 3a, is not sufficiently concentric about the fiber core 30a, the fiber end portion is unsheathed in order to reduce light transmission losses. Preferably, the cladding is treated with a suitable stripping chemical agent that makes the fiber epoxy cladding swell and soften up; the cladding is then pulled off and the fiber is cleaned off. Should, on the other hand, the fiber cladding be concentric with the fiber core, the V-shaped groove 20a, 20b can receive the core end portion of the fiber 3a, 3b directly.

Special cutting means, outside the scope of this invention, are then utilized for obtaining a fiber endface that is exactly perpendicular to the fiber axis and that is free of any defect in the vicinity of the fiber core. The cut is made at a distance on the unsheathed portion 30a that is substantially equal to the distance between the axis Y'Y and the first recess 21a. By way of an example, the cutting means comprises a ceramic or diamond knife for achieving a breakage nick and then exerts opposite pulling forces on either side of the nick in order to break the fiber.

Before the fibers are positioned, the upper part of the housing between the inner faces of the cover plates 10 above the central holder 2 is filled with an agent 24 such as a silicon grease or oil or preferably a silicon gel. The silicon gel has sufficiently low hardness to allow the fiber end portions to be introduced and positioned without difficulty. The gel does not run under its own weight; after injection into the housing 1, the gel does not ooze out through openings such as 23a, 23b in the housing.

By using two tools, such as tool 45 (FIG. 7) or tool 46 (FIG. 8), the two pressers 41a and 42a are raised upwards and held in the raised positions leaving said tools in place.

Special pliers, such as pliers 47 depicted in FIGS. 9 and 10, clamp the sheathed fiber 3a at a distance L from the cut-off endface thereof. The distance L is equal to half the housing 1 length taken along the axis X'X. The distance L is adjusted by means of a template 48 having two adjacent surfaces forming a re-entrant right dihedron. On surface 480 of the template dihedron is equal in length to L. By applying the cut-off endface of the fiber against the other surface of the template dihedron and the tip of the pliers 47 against the corresponding parallel edge of the template, the fiber can be pinched at the distance L. The fiber end portion is then fed into the housing 1 along the upper longitudinal edge of holder 2 and through the gel 24. The pliers 47 abut the respective vertical lateral edge of the housing such that the cut-off fiber endface lies in the connection plane defined by the axis Y'Y. Upon releasing both tools, such as 45 or 46, the pressers 41a and 42a are successively released and come downward under the effect of springs 43a and 44a to clamp the fiber 3a against the upper edge 20a–22a of the central holder 2. The pliers 47 are then removed.

The second fiber 3b is cut-off and positioned in the other half of the housing in a like fashion, except that the template 48 is not used. The template is replaced by the housing itself in that the endface of the fiber 3b is pushed forwards against the endface of the other fiber 3a already in place in the housing where the fiber 3b end portion is held in this position by pliers 47.

Once the fibers 3a and 3b have been inserted in housing 1, the silicon gel 24 is automatically caught between the two endfaces of the fibers. The silicon gel carries practically the same refractive index as the fibers thereby ensuring a fiber endface connection with a continuity of refractive index from one fiber to the other.

The silicon gel 24 is, furthermore, self-cleaning, a property not inherent in a silicon grease or oil. Should any dust inadvertently collect on the endface of a fiber before insertion in the housing, then the gel due to its adhesive capacity wipes off the fiber end portion as inserted into the housing and thus into the gel, thereby gathering the dust.

A further feature of the silicon gel 24 consists of its "self-healing" properties when the fibers are withdrawn from the housing 1. The gel cohesion is stronger than the gel adhesion on the surface of the fibers. Upon withdrawal of the fibers immersed in and closely surrounded by the gel, the gel closes in on the space created by the fiber withdrawal, and the fibers keep no trace of the gel. The gel is not drawn outwards by the fibers.

In an embodiment substantially analogous to the first foregoing embodiment, the elementary connecting device housing comprises only two longitudinal cover plates that are pressed together on the vertical and longitudinal central plane as in FIG. 3. The central holder 2 is done away with and is replaced by two symmetrical portions of the plates which, when the plates are brought together, form a structure analogous to holder 2 according to the first embodiment. For this particular embodiment, the assembly for aligning the fibers 3a and 3b made up of the V-shaped aligning grooves 20a and 20b, the first recesses 21a and 21b, the bearing surfaces 22a and 22b and the second recesses 23a and 23b is divided in two portions symmetrical about the longitudinal central plane and respectively included in the inner faces of the two cover plates. The latter assembly intended for fiber alignment can be achieved by fixing together two half-grooves which after assembly of the plates, define a channel through which the fiber end portions are inserted, guided and aligned. The channel section especially in the vicinity of grooves 20a and 20b can have a square or diamond cross-section. The lower corner of such a channel cross-section constitutes the V-shaped seat for the two fiber end portions.

The advantage of this embodiment lies in its reducing primarily the manufacturing costs of the connecting device. Indeed, each half of the fiber alignment channel can be produced easily by moulding or stamping techniques in particular.

Elementary connecting devices such as that described previously can be joined side by side in order to connect optical fibers in a first bundle to optical fibers in a second bundle. The two bundles can be optical fiber cables.

FIG. 11 is a diagram of a device for connecting two cables 32a and 32b each having two optical fibers 3a, 3b. The cable connecting device comprises a hollow parallelepipedal case 5 having a base 50 and a lid 51. Anchored at the ends of the base longitudinal axis by two half-collars 52a, 52b, screwed to the inner face of the base 50, are the sheathed end portions of the cables. Two elementary connecting housings 1 are secured to the centre of the base 50 by two screws 53 through holes 103 (FIG. 2) bored in the surrounding of the housing plates 10. Each of the housings 1 joins one optical fiber 3a from cable 32a to one optical fiber 3b from the other cable 32b. The housings 1 are arranged top-to-bottom so as to provide easy access to the heads 412a, 412b, 422a, 422b of the pressers using a raising tool such as tool 45 (FIG. 7). Once the connection has been made, the case 5 is closed by positioning the lid 51 on the base 50 and fixing it there with four screws 54.

FIGS. 12 to 14 are illustrations of a multifiber connecting device 6 in which elementary connecting devices such as that described above can be superposed on each other. The multifiber connecting device makes it possible for example to connect one linear array of optical fibers to another, where each array can come from a cable in which the optical fibers have been spread out into one or more ribbons or around one or more cylindrical rings, forming a composite cable. The multifiber connecting device 6 comprises a support plate 60 and plurality of partitions 61.

Each partition 61 as illustrated in FIG. 13 is obtained by folding and cutting out a small rectangular plate. Partition 61 comprises two sprung transversal tongues 62, slightly bent, that stand proud on one side of the partition, two pairs of flexible semi-circular transversal tongues 63 that run on either side of the tongues 62 and stand proud on the other side of the partition, and a longitudinal tab 64 at the base of the partition and obtained by a right-angle bend. The partition dimensions are of the order of those of the housing major sides.

As shown in FIG. 12, the support plate 60 is a vertically arranged rectangular plate on one side of which the partitions 61 are disposed perpendicularly one above the other. The longitudinal tab 64 of each partition can be welded to the support plate 60, or pinched in a groove running in support plate 60 and formed by cutting and drawing, or fixed by any other known means to the support plate 60.

Each housing 1 is oriented horizontally and inserted between two neighboring partitions 61 as illustrated in FIGS. 12 and 14. The two sprung tongues 62 of the lower partition press against the surface of the external recesses 100 in one of the housing 1 plates 10. The four semi-circular tongues 63 in the upper partition press against the surface of the external recess 100 in the other plate 10 of the housing 1. The housing 1 is thus held and locked by the two neighboring partitions 61. The longitudinal edge of the housing 1 on the central holder 2 side is fully pushed up against the tab 64 of the upper partition and the plate support 60. The heads 412 and 422 of pressers 41 and 42 protrude from the partition arrangement and can be raised using a tool such as 46 (FIG. 8).

In FIG. 15 are shown several support plates 60 having partitions 61 designed to accommodate housings 1 between them. The support plates 60 are arranged in parallel columns on a rack 65. The rack can represent a distribution frame or distribution sub-frame for a telephone exchange. Each housing 1 serves as a cable head that connects an optical fiber from an external cable to an optical fiber acting as a link cord called "jumper", or serves as a connection strip that connects an optical fiber acting as a jumper to an optical fiber from an internal cable feeding the switching equipment in the telephone exchange.

FIGS. 16 and 17 are illustrations of a second embodiment of a multifiber connecting device comprising a central box 7 having a trapezoidal longitudinal cross-section. Box 7 is made up of a base 70 and a cover 71 secured therewith and is symmetrical about a minor vertical transverse axis Y'Y defining the connection plane of the fiber endfaces.

Fixed to the center of the base 70 is a central flat holder 701 in the upper face of which deep V-shaped longitudinal aligning grooves 702 run. Each groove 702 is substantially greater in width than in diameter of the core end portion of an optical fiber. Two symmetrical rearward conduits 72a and 72b run substantially half in the base 70 and half in the cover 71. Each conduit 72a, 72b upwardly extends one of the ends of the groove 702 giving onto the outside of the box 7. The height of conduits 72a and 72b is considerably greater than the diameter of a fiber. The width of conduits 72a and 72b is substantially greater than the diameter of the core end portion of an optical fiber.

Above the central grooved holder 701, the underside of the cover 71 includes a cavity 710 into which give pairs of first flat pressers 80a and 80b, such as flat rectangular slides, respectively aligned above the grooves 702. Pressers 80a and 80b above each groove 702 slide in two closed-end grooves 711a and 711b in the cover 71 that are symmetrically inclined about the axis Y'Y and converge on the holder 701 below. The upper end of each presser 80a, 80b is thrust downward by elastic means such that the substantially rounded lower end of the presser slides in the top of the corresponding V-shaped groove 702 and, along two generating lines, presses the core end portion of the optical fiber 3a, 3b into the bottom of the V-shaped groove. The elastic means includes for example a transverse rubber cylinder 81a, 81b bonded to the bottom of the grooves 711a, 711b on the same side with respect to the axis Y'Y.

All the pressers 80a, 80b on a same side of the axis Y'Y are associated with a cylindrical hole 712a, 712b transversally through the cover 71. A segment of the hole 712a, 712b is truncated in order to open into the respective closed-end grooves 711a, 711b in line with their inclined edge opposite the axis Y'Y. Provided in the middle of the chord of the truncated segment is a small transverse groove 713a, 713b that is aligned with slots forming notches 82a, 82b provided on the inclined edges of the pressers 80a, 80b opposite the axis Y'Y when the latter are in the lowered position for pressing the respective fiber 3a, 3b core end portions. The grooves cylindrical hole 712a-713a, 712b-713b and the presser notches 82a, 82b are designed to cooperate with the tip of a presser raising tool 9 for selectively inserting or withdrawing fibers.

The raising tool 9, described hereafter with reference to FIGS. 18 to 20 comprises a cylindrical shaft 90. One end 91 of shaft 90 has a cross-section analogous to the holes 712a and 712b. The half-flat on the end 91 includes a radial pyramid-shaped snug 92 having a cross-section analogous to that of grooves 713a and 713b and notches 82a and 82b. The end 91 can slide in one grooved hole 712a-713a, 712b-713b, and the snug 92 can be embedded into the notch 82a, 82b of one of pressers with a view to raising the presser by axially rotating the shaft 90 against the thrust exerted by the elastic cylinder 81a, 81b.

To select the presser under which a fiber is to be inserted or withdrawn, tool 9 comprises a hollow cylindrical handle 93 that is mounted for axial sliding on the other end of the shaft 90, by means for example of a free key 94. A knurled adjustment screw 95 is screwed radially into the handle 93 and abutts the key 94 on the shaft 90 in order to lock the handle 93 translationally at the desired position on the shaft. The handle position is chosen in terms of that of the presser to be raised in the box 7. Markings indicated in FIG. 19 are inscribed on the shaft 90 half-flat between the snug 92 and the handle 93. One of the vertical longitudinal slides 73 of the box 7 serves as a reference surface for resting one end 96 of the handle to correspond with the selected marking, as in FIG. 18.

Handle end 96 and reference side 73 of the box in front of each hole 712a, 712b form an assemblage with a limited flange having two diametrally opposed lug segments and a complementary housing bore. The segment angles differ from each other and are differently configured with respect to the holes 712a and 712b such that the two bores serve in locking the handle and also as a fool-proof device.

The multifiber connecting device in the second embodiment further comprises two second pressers 83a and 83b such as flat rectangular slides for pressing the claddings 31a and 31b of each pair of fibers to be connected 3a and 3b. As depicted in FIG. 16, the second pressers 83a, 83b on a same side of the axis Y'Y are slidably mounted in longitudinal closed-end grooves 74a, 74b of a lateral composite housing member 75a, 75b fixed to one side of the central box 7. The cladding ends of the optical fibers are arranged in inclined rearward conduits 76a, 76b of the member 75a, 75b that prolongate the respective conduits 72a, 72b.

Second pressers 83a, 83b in each of lateral housing members 75a and 75b are associated in common, like the first pressers 80a, 80b, with a transverse cylinder 84a, 84b as well as with a grooved and truncated cylindrical hole 77a, 77b. Second pressers 83a, 83b further each comprise a notch 85a, 85b for cooperating with the snug 92 on the raising tool shaft 90 when shaft 90 slides in the corresponding hole 77a, 77b. The end of the second pressers in contact with the fiber cladding is also notched like 427 of the pressers 42 (FIG. 2).

Connecting the fibers 3a, 3b two by two involves a method analogous to that described beforehand. The central box 7 also contains a silicon gel 78 filling the cavity 710 above the central holder 701 and the grooves 702 and partially filling the conduits 72a, 72b.

The connecting device shown in FIG. 16 further comprises an optical magnifying system 79 for observing and monitoring how the optical fibers are abutted. The optical system 79 consists of two small conventional lenses 790 and 791 having optical axes aligned with the transverse plane defined by the axis Y'Y. Lenses 790 and 791 vertically overhang the middles of the grooves 702 and thus the fiber endface connections between the two sets of first pressers 80a and 80b, through the transparent silicon gel 78. The top of the optical system 79 is protected by a transparent cap 792 secured to the top of the cover 71.

What I claim is:

1. A device for connecting two optical fibers, said device comprising fiber supporting means having an alignment groove for receiving, aligning and joining endface-to-endface end portions of said two fibers, and two surfaces on either side of said alignment groove for bearing the claddings of said two fibers, two first and two second spring means, two first means slidably pulled to said alignment groove by said two first spring means for pressing said two fiber end portions into said alignment groove respectively, and two second means slidably pulled to said two bearing surfaces by said two second spring means for pressing said two fiber claddings onto said two bearing surfaces respectively.

2. The device claimed in claim 1 wherein said first pressing means slide perpendicularly to said alignment groove.

3. The device claimed in claim 1 wherein said two first pressing means slide according to two sliding directions inclined with respect to said alignment groove toward the connection of the endfaces of said two fibers.

4. The device claimed in claim 1 wherein said two second pressing means slide according to two sliding directions inclined with respect to said bearing surfaces toward said alignment groove.

5. The device claimed in claim 1 wherein ends of said second pressing means in contact with said fiber claddings are notched.

6. The device claimed in claim 1 wherein said bearing surfaces are notched.

7. The device claimed in claim 1 wherein ends of said first pressing means in contact with said end portions of said fibers are rotatably mounted about axes perpendicularly to the sliding direction of said first pressing means and the direction of said alignment groove.

8. The device claimed in claim 1 wherein said spring means for each of said pressing means is at least a spring having one end anchored to said pressing means and another end anchored to said supporting means.

9. The device claimed in claim 1 wherein said spring means for each of said pressing means is an elastic member embedded in a groove in which said pressing means slides.

10. The device claimed in claim 1 wherein said supporting means has recesses between said alignment groove and said bearing surfaces.

11. The device claimed in claim 1 wherein said end portions of said fibers pressed by said first pressing means are core end portions of said fibers.

12. The device claimed in claim 11 wherein said supporting means has recesses between said alignment groove and said bearing surfaces, each of said recesses containing the transition between the cladding end portion and the core end portion of one of said fibers.

13. A device claimed in claim 1 comprising a housing including said supporting means and said first and second pressing means, said first and second pressing means being slidably mounted in said housing above said alignment groove and said bearing surfaces respectively, said housing also including a gel in contact with said fibers, said gel running not under its own weight and oozing not out through housing openings for inserting and withdrawing said fibers.

14. The device claimed in claim 13 wherein said gel is not drawn outwards from said housing when said fibers are withdrawn from said housing.

15. The device claimed in claim 13 wherein said gel acts as a self-cleaning agent for the ends of said fibers.

16. A device as claimed in claim 1 comprising an optical magnifying system above the connection between said fiber endfaces in said alignment groove to observe the joining endface-to-endface of said two fibers.

17. A housing for connecting two optical fibers, said housing comprising:
a flat holder having a longitudinal edge defining an alignment direction of said fibers, said longitudinal edge including a central alignment groove for receiving, aligning and joining endface-to-endface end portions of said two fibers, and two surfaces on either side of said alignment groove for bearing the claddings of said two fibers,
two parallel flat cover plates having lower inner side portions embracing two major sides of said flat holder,
two first means for pressing said two fiber end portions into said alignment groove respectively, said two first pressing means being slidably mounted between upper portions of said inner sides of said cover plates and being pulled to said alignment groove by two first spring means respectively, and
two second means for pressing said fiber claddings onto said two bearing surfaces respectively, said two second pressing means being slidably mounted between said upper portions of said inner sides of said cover plates and being pulled to said bearing surfaces by two second spring means respectively.

18. The housing claimed in claim 17 wherein said first pressing means slide perpendicularly to said alignment groove, and said second pressing means slide according to two sliding directions inclined with respect to said bearing surfaces toward said alignment groove.

19. The housing claimed in claim 17 wherein each of said first and second pressing means is a T-shaped member having a head protruding above a longitudinal upper edge of said cover plates, a leg forming a tongue sliding between said cover plates and a leg foot applied against one of said fibers.

20. The housing claimed in claim 19 wherein said foot of each of said first pressing means is rotatably mounted about an axle secured to said leg of said first pressing means according to a direction perpendicular to the sliding direction of said leg of said first pressing means and the direction of said alignment groove.

21. The housing claimed in claim 19 wherein the edges of said feet of said second pressing means in contact with said fiber claddings, and said bearing surfaces are notched perpendicularly to said fibers.

22. The housing claimed in claim 19 wherein said spring means for each of said pressing means is at least a spring having one end anchored to said leg of said pressing means and another end anchored to an axle integral with said holder, said spring being applied against an outer side of said cover plates.

23. The housing claimed in claim 17 wherein said fiber end portions are core end portions of said fibers, and said longitudinal edge of said holder includes recesses between said alignment groove and said bearing surfaces for each containing the transition between the cladding end portion and the core end portion of one of said fibers.

24. The housing claimed in claim 17 wherein said longitudinal edge of said holder includes end recesses forming inlet orifices for said fibers.

25. A box for connecting two optical fibers, said box comprising:
a central base including a central flat holder having a longitudinal alignment groove for receiving, aligning and joining endface-to-endface end portions of said fibers,
a central cover secured to said central base above said central holder, said central base and cover forming two fiber guiding conduits on either side of said alignment groove,
two first means for pressing said two fiber end portions into said alignment groove respectively, said two first pressing means being slidably mounted in two closed-end grooves in said central cover and being pulled to said alignment groove by two first spring means lodged in the bottoms of said two closed-end grooves respectively,
two lateral composite housing members secured in either side of said central base and cover, and
two second means for pressing the claddings of said two fibers into two lateral conduits in said lateral housing members respectively, each of said lateral conduits prolongating one of said fiber guiding conduits, said two second pressing means being slidably mounted in two closed-end grooves in said two lateral composite housing members and being pulled to said lateral conduits by two second spring means lodged in the bottoms of said two closed-end grooves of said lateral housing members respectively.

26. The box claimed in claim 25 wherein said first pressing means slide according to two sliding directions inclined with respect to said alignment groove toward the connection of said endfaces of said two fibers, and said second pressing means slide according to two sliding directions inclined with respect to said lateral conduits toward said alignment groove.

27. The box claimed in claim 25 wherein each of said first and second spring means is a rubber cylinder.

28. A box as claimed in claim 25 wherein each of said first and second pressing means is a flat slide having a lateral slot, and wherein axially truncated cylindrical holes give into said closed-end grooves respectively, each of said holes being grooved in the prolongation of said lateral slot of said respective pressing slide to receive an end of a tool for raising said pressing slide, said tool end being cylindrical with a half-flat and a radial snug complementing said slide slot.

29. The box claimed in claim 25 wherein the edges of said second pressing means in contact with said fiber claddings are notched perpendicularly to said fibers.

30. The box claimed in claim 25 wherein said end portions of said fibers pressed by said first pressing means are core end portions of said fibers, and wherein each of said fiber guiding conduits formed between said central base and cover contains the transition between the cladding end portion and the core end portion of one of said fibers.

31. A box as claimed in claim 25 comprising an optical magnifying system included in said central cover above the connection between said fiber endfaces in said alignment groove to observe the joining endface-to-endface of said two fibers.

32. A multifiber connector for connecting first and second bundles of optical fibers, said multifiber connector comprising a plurality of substantially flat housings, each of said housings including two-fiber supporting means, two first pressing means and two second pressing means, said supporting means having an alignment groove for receiving, aligning and joining endface-to-endface end portions of one fiber of said first bundle and one fiber of said second bundle, and two surfaces on either side of said alignment groove for bearing the claddings of said two fibers, said two first pressing means being slidably mounted in said housing and being pulled by two first spring means to said alignment groove for pressing said two fiber end portions into said alignment groove respectively, said second pressing means being slidably mounted in said housing and being pulled by two second spring means to said two bearing surfaces for pressing said claddings of said two fibers onto said bearing surfaces respectively, said multifiber connector also comprising means for stacking parallelly said housings.

33. The multifiber connector claimed in claim 32 wherein said stacking means comprises a planar support having parallel partitions between which said housings are inserted.

34. The multifiber connector claimed in claim 33 wherein said partitions are removable.

35. The multifiber connector claimed in claim 33 wherein each of said partitions comprises protruding sprung portions for locking adjacent housings.

36. The multifiber connector claimed in claim 32 wherein said stacking means comprises a case having a base and a lid, means for securing the stacked housings in said base and means for securing said first and second bundles in said base on either side of said stacked housings.

37. The multifiber connector claimed in claim 36 wherein said means for securing the stacked housings comprises screws crossing said stacked housings.

38. The multifiber connector claimed in claim 32 wherein two adjacent stacked housings are arranged top to bottom.

* * * * *